US008160800B2

(12) United States Patent
Hawkins et al.

(10) Patent No.: US 8,160,800 B2
(45) Date of Patent: Apr. 17, 2012

(54) SYSTEM AND METHOD OF FAN CONTROL

(75) Inventors: Jeffery S. Hawkins, Farmington Hills, MI (US); Todd C. Slater, Indianapolis, IN (US); Charles C. Blake, Commerce, MI (US); Miguel Menoyo-Alonso, Royal Oak, MI (US); Darren P. Aherne, Cambridge (GB); Matthew T. Baird, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 1144 days.

(21) Appl. No.: 11/959,614

(22) Filed: Dec. 19, 2007

(65) Prior Publication Data

US 2009/0164084 A1 Jun. 25, 2009

(51) Int. Cl.
*G06F 19/00* (2011.01)

(52) U.S. Cl. ..... 701/101; 701/36; 123/179.4; 123/41.49

(58) Field of Classification Search .................. 701/101, 701/29, 36; 123/436, 179.4, 350, 41.49, 123/41.56, 41.58
See application file for complete search history.

(56) References Cited

U.S. PATENT DOCUMENTS

| | | | | |
|---|---|---|---|---|
| 4,314,487 | A | 2/1982 | Ahlen et al. | |
| 5,359,969 | A | 11/1994 | Dickrell et al. | |
| 5,445,128 | A | 8/1995 | Letang et al. | |
| 5,615,654 | A | 4/1997 | Weisman, II et al. | |
| 5,679,093 | A | 10/1997 | Desautels et al. | |
| 5,732,676 | A * | 3/1998 | Weisman et al. | 123/436 |
| 5,847,644 | A | 12/1998 | Weisman, II et al. | |
| 6,026,784 | A * | 2/2000 | Weisman et al. | 123/436 |
| 6,045,482 | A | 4/2000 | Nishar et al. | |
| 6,067,489 | A * | 5/2000 | Letang et al. | 701/36 |
| 6,079,536 | A | 6/2000 | Hummel et al. | |
| 6,220,223 | B1 * | 4/2001 | Weisman et al. | 123/436 |
| 6,273,034 | B1 | 8/2001 | Hawkins et al. | |
| 6,328,000 | B1 | 12/2001 | Hawkins et al. | |
| 6,330,873 | B1 * | 12/2001 | Letang et al. | 123/322 |
| 6,453,853 | B1 | 9/2002 | Hawkins et al. | |
| 6,463,891 | B2 | 10/2002 | Algrain et al. | |
| 6,571,751 | B2 | 6/2003 | Vogt | |
| 6,748,305 | B1 | 6/2004 | Klausner et al. | |
| 6,750,623 | B1 | 6/2004 | McCauley et al. | |
| 6,772,714 | B2 | 8/2004 | Laird et al. | |
| 6,880,497 | B1 | 4/2005 | Avery, Jr. et al. | |
| 6,904,352 | B2 | 6/2005 | Hawkins et al. | |

* cited by examiner

*Primary Examiner* — John Kwon
(74) *Attorney, Agent, or Firm* — Bill C. Panagos; Rader, Fishman & Grauer PLLC

(57) ABSTRACT

A method to operate a vehicle equipped with an electronic controlled internal combustion engine. The engine fan is used as a dynamic fan brake when the vehicle exceeds a minimum predetermined operating parameter for a predetermined period of time, and is disabled once the vehicle is operating within predetermined operating parameters.

12 Claims, 2 Drawing Sheets

SYSTEM AND METHOD OF FAN CONTROL

BACKGROUND OF THE INVENTION

1. Field of the Invention

The present invention relates to a method of electronic engine fan control in a vehicle with an internal combustion engine equipped with an electronic engine control system.

2. Description of the Related Art

Letang, et al., U.S. Pat. No. 5,445,128 discloses a method for comprehensive integrated control of a compression-ignition internal combustion engine having integral fuel pump-injectors utilizing all electronic control unit is disclosed. The control strategy integrates various functions of engine control including fuel delivery, cooling fan control, engine speed governing and overspeed protection, engine braking, torque control, and vehicle speed diagnostics and control. Cooling fan control is integrated with vehicle speed diagnostics and control as well as fuel delivery to provide an integrated cruise control function which incorporates engine braking. The method also includes improved control over the various engine speed governors while improving idle quality by balancing the power delivered by each of the engine cylinders when at idle. The integrated torque control employs functions to reduce NOx emissions and noise utilizing adaptive fuel delivery timing and a split injection strategy.

SUMMARY OF THE INVENTION

A method to control an engine cooling fan (fan used for cooling engine coolant and/or compressed charge air via charge air cooler) in a vehicle/equipment with an internal combustion engine equipped with an electronic controller having memory and an engine fan and a transmission. The method includes enhancements to previously developed strategies for using the engine fan to provide additional vehicle braking, calibratable options for fan control when a new type of diagnostic fault (rationality checks) are active, and enhanced transmission retarder fan control logic. Fan control logic typically has a minimum on time in order to avoid fan cycling. The use of a common minimum on-time timer for all inputs to the fan control system may result in fan being enabled when unnecessary. Excess fan operation will result in lower fuel economy and reduced vehicle performance as a portion of the engine power is being used to drive the fan. The vehicle braking enhancement includes using a separate calibratable minimum fan on timer exclusively for dynamic brake requests. A second method for reducing excess fan operation by improving the vehicle fan braking logic is to immediately disable the fan once the vehicle fall brake request is no longer active, if the vehicle fan brake request is the only request for fan enablement.

The method may further include enabling the engine fan based on a rationality fault. For 2007, the California Air Resource Board established legal requirements per the title 13, California Code of Regulations, §1971. Engine Manufacturer Diagnostic System Requirements—2007 and Subsequent Model-Year Heavy-Duty Engines. The EMD regulation requires manufacturers to implement "rationality" diagnostics for all emissions relevant engine control system inputs and outputs. Per the EMD regulation "Rationality fault diagnostic" for an input component means verification of the accuracy of the input signal while in the range of normal operation and when compared to all other available information. This new class of faults is more difficult to determine than simple voltage comparisons versus a threshold as they involve determining under what engine and vehicle conditions a diagnostic check should be made. Furthermore, the engine parametric data is compared with other existing engine parametric data to determine the rationality (feasibility) of the data. Since these diagnostics are conducted on inputs that are also used for engine fan control, the following has been method has been developed for integrating this new diagnostic logic into the electronic fan control strategies. There is a calibratable to either enable the fan when a rationality fault has been determined on a fan system input (i.e. coolant temperature or oil temperature) or ignore the fault (use existing data even if determined to be irrational).

The method may further include enhancements to our transmission retarder fan control logic. Transmission retarders are capable of more heat rejection than the engine. Therefore, it is important to have anticipatory fan logic for applications with transmission retarders to reduce the amplitude of heat spikes to provide sufficient engine cooling and to avoid nuisance codes. Prior art used coolant temperature and transmission retarder status to determine whether or not the fan should be enabled. The fan was enabled if coolant temperature exceeded a minimum threshold and the retarder was active. In order to prevent unnecessary fan operation, additional criteria to enable the fan are added which include both a minimum vehicle speed threshold and a minimum transmission retarder temperature, both which must be exceeded in addition to exceeding the minimum coolant temperature threshold and having the transmission retarder active in order to enable the fan based on the transmission retarder.

DETAILED DESCRIPTION OF THE PREFERRED EMBODIMENT

Figure 1:
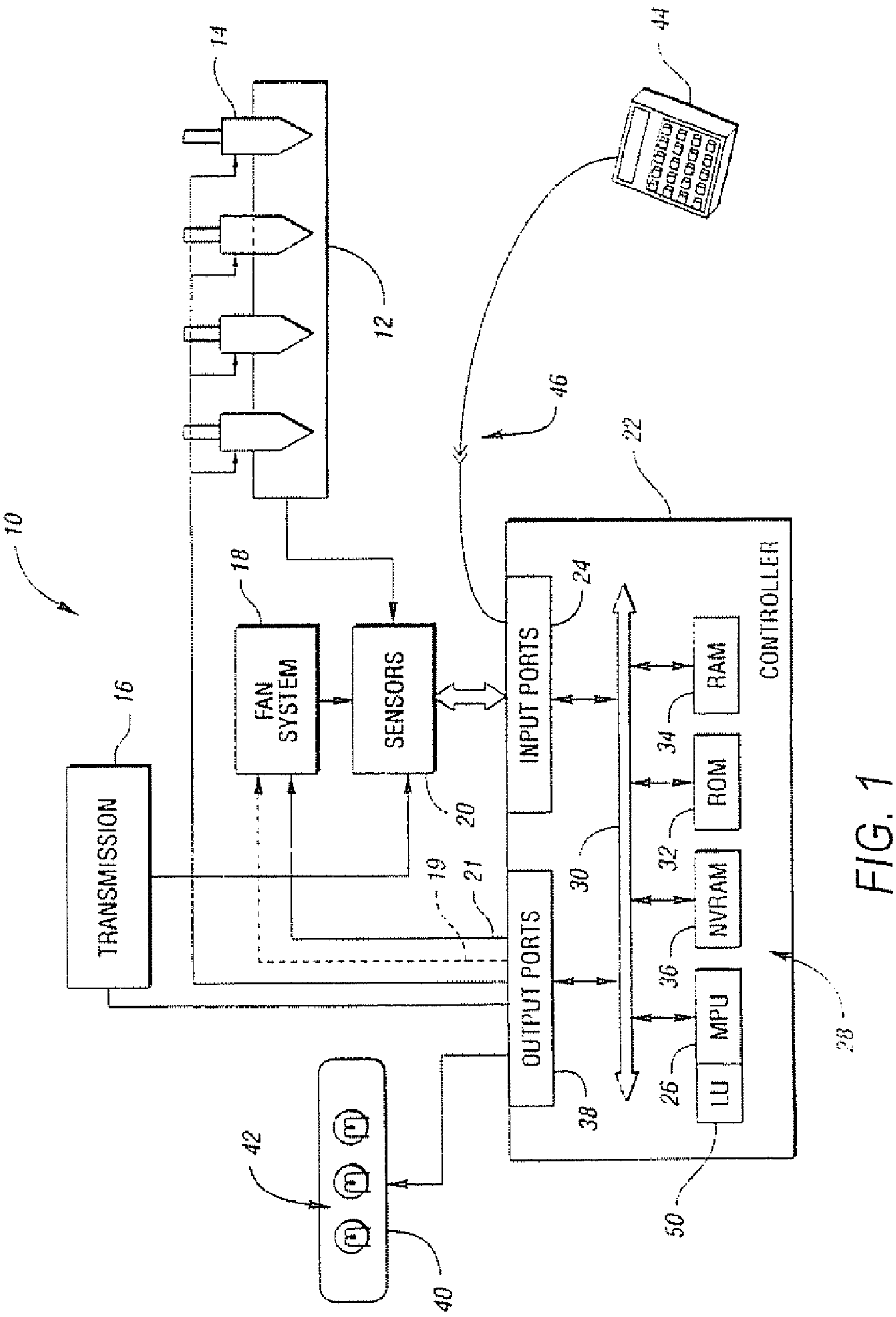
FIG. 1 is a schematic representation of an engine, engine control system in a vehicle in accordance with one aspect of the present invention.

With reference to FIG. 1, an internal combustion engine and associated control systems and subsystems are generally indicated at 10. System 10 includes an engine 12 having a plurality of cylinders, each fed by fuel injectors 14. In a preferred embodiments engine 12 is a compression-ignition internal combustion engine, such as a heavy duty diesel fuel engines injectors 14 receive pressurized fuel from a fuel supply in a known manner.

System 10 also includes a vehicle transmission 16 and a fan system 18. Fan system 18, and the various embodiments of the present invention, may suitably be implemented as an electrically driven fan system, a hydraulically driven fan system, or a direct drive system with a variable fan clutch. It is appreciated that some embodiments of the present invention are most suited for a hydraulically driven fan system, but some embodiments may be used alternatively with other types of fan systems. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable speed fan system 18. The program instructions direct controller 22 to control the various systems and subsystems of the vehicle, with the instructions being executed by microprocessor 26, and optionally, instructions may also be executed by any number of logic units 50. Input ports 24 receive signals from sensors 20, and controller 22 generates signals at output ports 38 that are directed to the various vehicle components. The signals may be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, temperature thresholds for variable speed fan control, and others.

In operation, controller 22 receives signals from sensors 20 and executes control logic embedded in hardware and/or software to control the engine, including controlling variable speed fan system 18. In a preferred embodiment, controller 22 is the DDEC controller available from Detroit Diesel Corporation, Detroit, Mich. Various other features of this controller are described in detail in a number of different U.S. patents assigned to Detroit Diesel Corporation. In particular, fan system 18 is controlled by all applied fan request signal 21 that commands the fan system. The applied fan request signal is generated by controller 22 based on any number of different factors such as various temperatures at different parts of the engine. Further, in accordance with the present invention, controller 22 processes a plurality of initial fan request signals using various techniques of the present invention to arrive at the final applied fan request signal that is sent to fan system 18. Further, in some implementations, additional information may also be supplied to fan system 18 as indicated by dashed line 19. The additional information such as, for example, an engine compartment temperature at a predetermined engine compartment hot spot, may be provided to fan system 18, such that fan system 18 may modify fan operation without strictly controlling the fan in accordance with the applied fan request 21. For example, fan system 18 may effect special control of the fan system, for example, during a cold engine start up as determined by a temperature at input 19.

As is appreciated by one of ordinary skill in the art, control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategy may be used to control an engine in accordance with the present invention.

Further, it is to be appreciated that the engine controller may receive information in a variety of ways. For example, transmission information could be received over a data link, at a digital input or at a sensor input of the engine controller. Continuing with the transmission information example, transmission parameters such as transmission oil sump temperature, transmission retarder status, etc., may be received over a digital communication data link. The data link could be in accordance with a Society of Automotive Engineers (SAE) protocol, such as SAE J1587 or SAE J1939.

The method may further include enhancements to our transmission retarder fall control logic. Transmission retarders are capable of more heat rejection than the engine. Therefore, it is important to have anticipatory fan logic for applications with transmission retarders to reduce the amplitude of heat spikes to provide sufficient engine cooling and to avoid nuisance codes. Prior art used coolant temperature and transmission retarder status to determine whether or not the fan should be enabled. The fan was enabled if coolant temperature exceeded a minimum threshold and the retarder was active. In order to prevent unnecessary fan operation, additional criteria to enable the fan are added which include both a minimum vehicle speed threshold and a minimum transmission retarder temperature, both which must be exceeded in addition to exceeding the minimum coolant temperature threshold and having the transmission retarder active in order to enable the fan based on the transmission retarder.

When a digital input to the engine controller is used to receive information, a twisted pair could be hard wired to the engine controller digital input, from the transmission. The digital input could then be left open (high) or pulled to ground to indicate information Such as transmission retarder status as active or inactive, respectively. In another digital input example, a temperature switch could be hard wired to the digital input such that open indicates a temperature above a threshold while closed (pulled to ground) indicates a normal temperature (below the threshold).

And further, in the example, a sensor such as a sensor with an analog output could be wired to a sensor input of the engine controller. Further, it is appreciated that transmission information is an example, and the above techniques and others may be employed to provide other types of information to the engine controller.

The method may further include enabling the engine fan based on a rationality fault. For 2007, the California Air Resource Board established legal requirements per the title 13, California Code of Regulations, §1971. Engine Manufacturer Diagnostic System Requirements—2007 and Subsequent Model-Year Heavy-Duty Engines. The EMD regulation requires manufacturers to implement "rationality" diagnostics for all emissions relevant engine control system inputs and outputs. Per the EMD regulation "Rationality fault diagnostic" for an input component means verification of the accuracy of the input signal while in the range of normal operation and when compared to all other available information. This new class of faults is more difficult to determine than simple voltage comparisons versus a threshold as they involve determining under what engine and vehicle conditions a diagnostic check should be made. Furthermore, the engine parametric data is compared with other existing engine parametric data to determine the rationality (feasibility) of the data. Since these diagnostics are conducted on inputs that are also used for engine fan control, the following has been method has been developed for integrating this new diagnostic logic into the electronic fan control strategies. There is a calibratable to either enable the fan when a rationality fault has been determined on a fan system input (i.e. coolant temperature or oil temperature) or ignore the fault (use existing data even if determined to be irrational).

Figure 2:
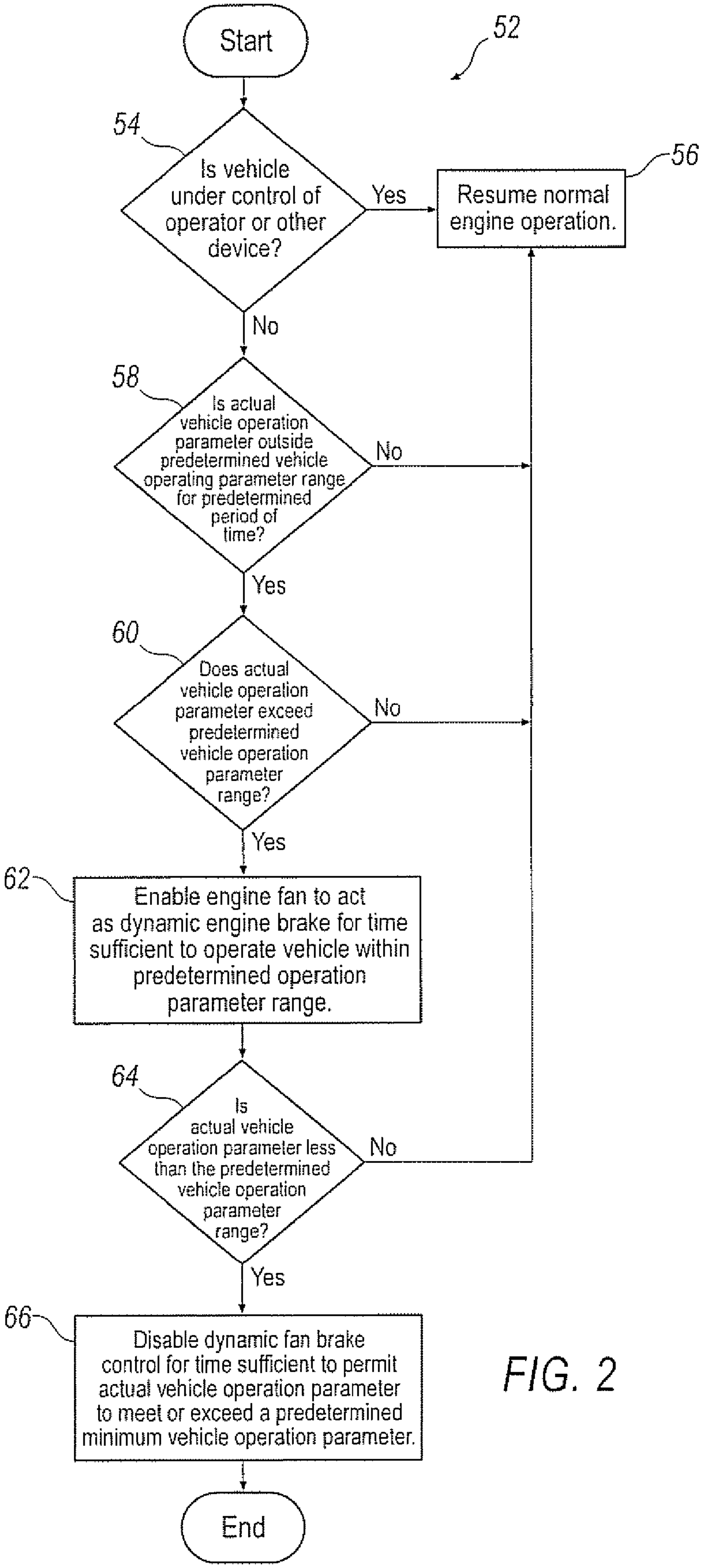
FIG. 2 is a software flowchart of the steps of one method according to the present invention.

FIG. 2 is a software flowchart of method 52 according to one embodiment of the present invention. Step 54 is determining whether the vehicle is under the control of an operator or operating under an engine mode of operation such as cruise control or adaptive cruise control, or in some other manner under the operation of the electronic controller. If yes, then step 56 is to continue normal engine operation. If the determination at step 54 is no, step 5S is determining whether the actual vehicle operating parameter is outside a calculated vehicle operating parameter range for a predetermined period of time. For example, if vehicle speed were to be considered, the method may consider where the vehicle is repeatedly climbing and declining over the hilly terrain to determine whether the vehicle speed is outside a calculated vehicle speed range for a predetermined period of time.

Step 60 is determining whether the actual vehicle operating parameter exceeds a calculated vehicle operating parameter range. For example, if the vehicle operating parameter being considered is vehicle speed, as a vehicle declines from a hill, the acceleration due to gravity becomes an additive to a calculated vehicle speed, such that a vehicle may experience uneven speeds as it travels through hilly terrain. This phenomenon must considered in the determination of whether a vehicle speed exceeds a calculated vehicle speed for a predetermined period of time. If the determination in step 60 is yes, step 62 is enabling engine fan to act as a dynamic brake for a time sufficient to operate the vehicle within a predetermined vehicle operation parameter. At step 64, a determination is made whether the actual vehicle operating parameter is less than a predetermined vehicle operating parameter. If no, the engine continues normal operation as at step 56. If it is determined the actual vehicle operating parameter is below a predetermined range, step 66 is disabling the dynamic fan brake control for a time sufficient to enable vehicle to meet or exceed the predetermined vehicle operating parameter.

Generally, rationality checks are performed to determine whether sensed vehicle operating parameters, such as engine coolant temperature, engine oil temperature, vehicle speed, and transmission retarder temperature. The checks compare the actual vehicle operating parameters, such as the various engine system or transmission temperatures or vehicle speed with a predetermined value to determine whether the sensed operating parameters are accurate. One the rationality check confirms the accuracy of the sensed operating parameter, the method employs the sensed operating parameter to determine how to control the engine fan.

While one method of the invention has been set forth in the specification, it is understood that the words employed are words of description and not words of limitation. Many modifications and variations are possible without departing from the scope and spirit of the invention as set forth in the appended claims.

What is claimed as new and desired to be protected by Letters Patent of the United States is:

1. A method to operate an internal combustion engine equipped with an electronic controller having memory and an engine fan, in a vehicle; said vehicle equipped with a transmission; said transmission coupled to said engine and in electronic communication therewith; said method comprising:

determining separate calibratable minimum engine cooling fan on timers for various engine and transmission operating parameters and requests for engine cooling fan operation as a dynamic engine fan brake;

enabling engine cooling fan operation as a dynamic brake when said engine and transmission operating parameters exceed a predetermined threshold for a predetermined period of time;

disabling engine cooling fan operation as a dynamic brake when an engine fan brake request is no longer active.

2. The method of claim 1, further including conducting a rationality check to determine whether an engine cooling fan dynamic brake request based upon sensor input is a valid request.

3. The method of claim 2, wherein said sensor inputs include actual engine coolant temperature, engine oil temperature, vehicle speed, transmission retarder temperature, and whether said transmission retarder is active; said rationality check comparing said actual sensor inputs to calculated engine coolant temperature, engine oil temperature, vehicle speed, transmission retarder temperature and whether said transmission retarder is active for a predetermined period of time.

4. The method of claim 2, further including activating said engine coolant fan as a dynamic brake when vehicle speed, transmission retarder temperature and engine coolant temperature exceed a predetermined threshold.

5. The method of claim 1, further including disabling said dynamic fan brake when it is determined that the vehicle is under operator control or said engine is operating under cruise control or adaptive cruise control.

6. The method of claim 3, further including disengaging said fan as a dynamic engine brake if said vehicle is below a predetermined minimum speed for a predetermined period of time.

7. A method to operate a vehicle with an internal combustion engine coupled to a transmission; said engine and transmission in electronic communication; said engine equipped with an electronic controller with memory, said engine further equipped with an engine cooling fan, said method comprising:

determining whether said vehicle is under control of an operator or other engine mode of operation;

determining whether said vehicle is operating outside a predetermined parameter for a predetermined period of time;

enabling said engine fan to act as a dynamic brake for a time sufficient to conform operation of said vehicle to said predetermined parameters;

disabling said engine fan as a dynamic brake when said vehicle is operating within said predetermined parameters.

8. The method of claim 7, further including conducting a rationality check to determine whether an engine cooling fan dynamic brake request based upon sensor input is a valid request.

9. The method of claim 8, wherein said sensor inputs include engine coolant temperature, engine oil temperature, vehicle speed, transmission retarder temperature, and whether said transmission retarder is active; said rationality check comparing said actual sensor inputs to calculated engine coolant temperature, engine oil temperature, vehicle speed, transmission retarder temperature and whether said transmission retarder is active for a predetermined period of time.

10. The method of claim 8, further including activating said engine coolant fan as a dynamic brake when vehicle speed, transmission retarder temperature and engine coolant temperature exceed a predetermined threshold.

11. The method of claim 7, further including disabling said dynamic fan brake when it is determined that the vehicle is under operator control or said engine is operating under cruise control or adaptive cruise control.

12. The method of claim 9, further including disengaging said fan as a dynamic engine brake if said vehicle is below a predetermined minimum speed for a predetermined period of time.

* * * * *